United States Patent [19]
Bastide

[11] 3,829,122
[45] Aug. 13, 1974

[54] SAFETY APPARATUS FOR A VEHICLE

[76] Inventor: Paul Bastide, 108, rue de Rennes, 75, Paris 6°, France

[22] Filed: May 25, 1973

[21] Appl. No.: 364,134

Related U.S. Application Data

[63] Continuation-in-part of Ser. No. 122,821, March 10, 1971, abandoned.

[30] Foreign Application Priority Data

Mar. 11, 1970 France .................... 70.8629
July 30, 1970 France .................... 70.28090

[52] U.S. Cl. ............................ 280/150 B, 2/2.5
[51] Int. Cl. ............................ B60r 21/10
[58] Field of Search ........ 280/150 SB, 150 B; 2/2.5

[56] References Cited
UNITED STATES PATENTS

| | | | |
|---|---|---|---|
| 2,771,123 | 11/1956 | Doolittle | 280/150 SB |
| 3,484,134 | 12/1969 | Townsend | 280/150 SB |
| 3,524,679 | 8/1970 | De Lavenne | 280/150 B |
| 3,557,384 | 1/1971 | Barron | 2/2.5 |

FOREIGN PATENTS OR APPLICATIONS 1,068,761 2/1954 France .................... 280/150 SB

*Primary Examiner*—Robert R. Song
*Attorney, Agent, or Firm*—Waters, Roditi, Schwartz & Nissen

[57] ABSTRACT

Safety apparatus for a vehicle for minimizing injury to occupants in the event of a front-end collision comprising a seat to which the occupant is secured by a lap belt, a shoulder belt, or a harness in the form of a protective jacket, the seat or a frame for the securing means being mounted for displacement in the event of a collision to allow the occupant to travel along an extended path. An energy absorbing mechanism such as a braking device is connected to the displaceable structure to absorb the kinetic energy of the moving occupant and limit deceleration forces on the occupant. The steering wheel, steering post, instrument panel and windshield are so supported and constructed to be movable out of the path of travel of the occupant when the vehicle is subjected to intense deceleration in a collision and a shock absorber is positioned in the path of the occupant to cushion impact at the end of travel.

13 Claims, 28 Drawing Figures

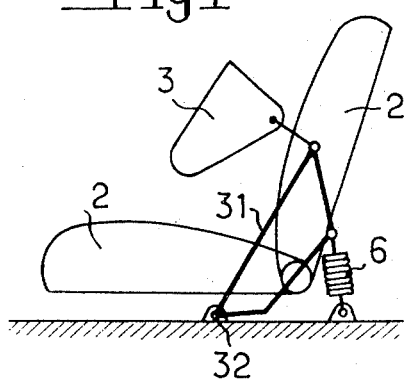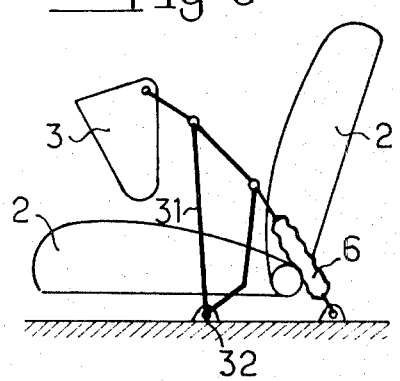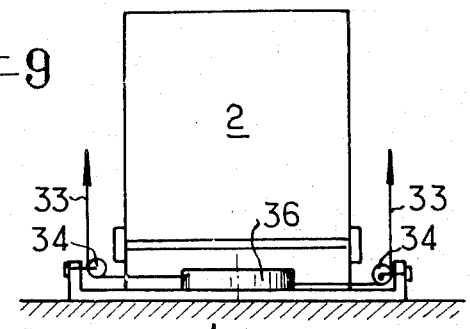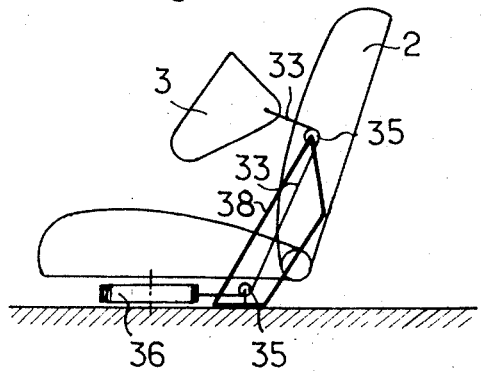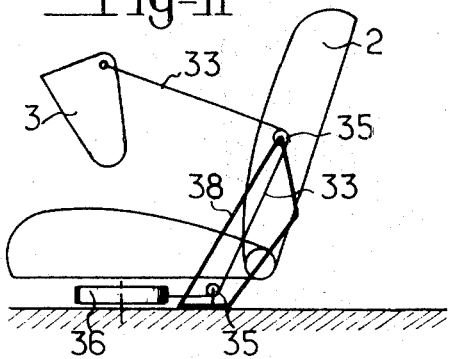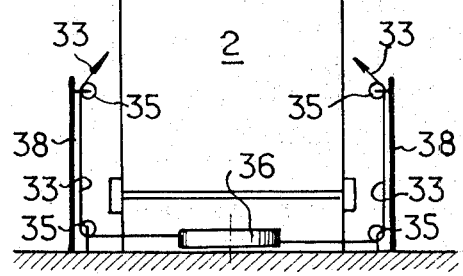

SAFETY APPARATUS FOR A VEHICLE

CROSS RELATED APPLICATION

This Application is a C-I-P of my earlier application Ser. NO. 122,821 filed Mar. 10, 1972, now abandoned, and claiming the priority of my applications filed in France on Mar. 11, 1970 and July 30, 1970.

BACKGROUND

When the front of an automotive or similar vehicle undergoes a violent impact bringing such vehicle to a sudden stop, the passengers are urged by inertia forwardly where they can strike against interior structure of the vehicle.

In the present state of the art, there are two means for averting such danger.

One of such means is the safety belt (or harness or jacket) which holds each passenger in his seat. But this requires the belt to be strong enough not to rupture under the strain of the weight of the passenger subjected to intense deceleration with serious and sometimes fatal consequences. Moreover, by reason of the woven or braided construction of the belt, it can stretch to absorb only an insignificant portion of the passenger's kinetic energy.

The other of such means to protect the passenger consists of a normally empty bag which must be instantaneously inflated at the moment of violent impact and it also must be deflated upon impact by the passenger to absorb his kinetic energy and prevent him from being hurled backward again. It will be observed that this complex requirement is, to say the least, very difficult to fulfill, and even if fulfilled would leave the passenger only a very short travel path leading to considerable deceleration and accordingly sometimes fatal consequences.

SUMMARY OF THE INVENTION

An object of the invention is to substantially reduce or eliminate such dangers.

Another object of the invention is to provide an assembly which in the case of a violent collision, guarantees each passenger a comparatively long and braked travel path in the course of which the applied braking absorbs considerable amounts of the passenger's kinetic energy, resulting in a negative acceleration which is easily tolerable.

Such an assembly provides a great improvement in individual protection against collisions, especially for the spinal column and sexual organs; it allows each passenger to be simultaneously protected against impacts with heavy and large masses and against impacts with pointed, sharp or cutting parts which can arise, for example, from the rupture of a portion of the front of the vehicle which has taken the impact of the collision. Moreover, it provides each passenger full freedom of movement and allows him, in particular, to leave the vehicle without having to extricate himself from his jacket, to come and go outside the vehicle as for example in a service station and then to resume his seat in the vehicle without difficulty.

According to the invention, the assembly comprises:

a first means such as safety belts or jackets or harnesses;

a second means of kinetic energy absorption which is fastened directly or not to each safety belt or jacket and allows the driver and each passenger a long travel path inside the car;

a third means allowing the said travel path to be clear from obstacles such as the steering wheel, panel instruments or, the windshield; and a fourth means of shock absorption allowing accommodation of the driver and each passenger at the end of his long travel path.

According to a further characteristic feature of the invention relative to said first means, each passenger puts on a special safety jacket, worn permanently during the journey, effectively protecting the passenger's torso, spinal column and genitalia from impact on any rounded or sharp-edged objects, such jacket being fastened on each side to a recoil brake which checks the passenger (thrown forward through an automatically opened windshield under the influence of the collision) along a sufficiently long travel length so that the passenger will undergo only a gradual deceleration which is harmless to his body.

The invention utilizes, in an original and novel manner, a safety belt (or harness or jacket) known per se and hereinafter the term "safety belt" refers to harnesses, such as shoulder belts, jackets as well as safety belts, viz one or more straps or belts, all comprising at least two or three anchoring points. In such case, each passenger's safety belt (or harness or jacket), instead of being anchored at some fixed point of the car is, according to the invention, fastened directly or not to the said second means of kinetic energy absorption, which means allow the passenger to travel along a distinctive track (the said travel path) although restricted of course generally to the inside or possibly slightly outside the car, this being very powerfully supported to resist forces considerably higher than the passenger's inertial weight and non-elastic (in order not to throw the passenger backward again).

The connection between the belt and the kinetic energy absorption means can, according to the invention, be direct or indirect: according to one embodiment, the passenger's seat rests on a cradle to which the safety belt and said means of kinetic energy absorption are attached; according to a further embodiment, the safety belt is attached to two swiveling side brackets to which the said absorption means is fastened; according to yet another embodiment, the safety belt is held by ropes leading back over pulleys to the said absorption means.

The means of kinetic energy absorption can consist conventionally of brakes; according to other embodiments, these means which are only called into operation very rarely but with total reliability, can consist of deformable elements.

The said third means which allows clearance of the path for the driver and/or passengers comprises firstly means guaranteeing removal of the steering wheel and steering post, secondly means for removing the instrument panel, certain of these guaranteeing its clearance out of the way and, thirdly a device allowing automatic swinging of the windshield and its entire frame on low-set horizontal hinges, the ultimate position of the windshield after its automatic opening being sloped slightly upward so that the body of the passenger thrown forward and sliding on the surface of the windshield is guided gently upward to avoid any contact with parts of the front portion of the vehicle which may have been distorted or torn by the collision.

The fourth means comprises a resilient cushion to receive the head and if need be the chest of the passenger at the end of the said travel paths and in cases where the said energy braking might not have been sufficient to counteract the passenger's velocity.

BRIEF DESCRIPTION OF THE DRAWING

FIG. 7 is a side view of a seat with swivel brackets according to another embodiment of the invention;

FIG. 8 is analogous to FIG. 7 and illustrates the operation of this embodiment;

FIG. 9 is a rear view of a seat according to an embodiment allied to that according to FIGS. 7 and 8;

FIGS. 10, 11, 12 are analogous respectively to FIGS. 7, 8, 9 illustrating a seat with permanent brackets according to another embodiment of the invention;

DETAILED DESCRIPTION

Figure 1:
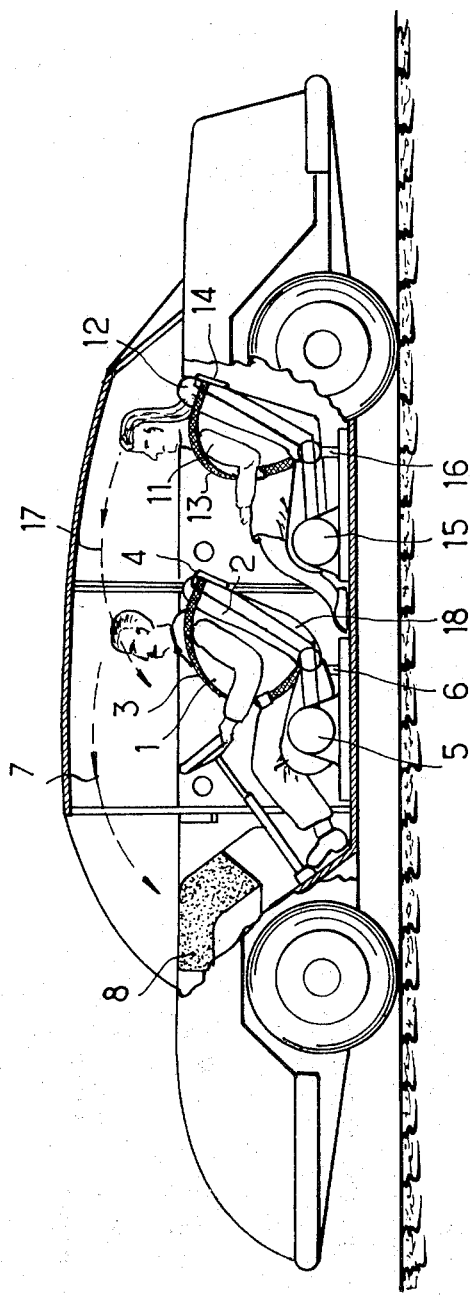
FIG. 1 is a diagrammatic longitudinal sectional view of an automobile showing the driver and one passenger in the back according to one embodiment of the invention.

With reference to the embodiment of the invention in FIG. 1, therein is seen a driver 1 in seat 2 attached by a safety belt 3 to a cradle 4 on which all the belt-anchoring points are mounted. The cradle is pivotable on a transverse horizontal shaft 5 located under and to the rear of the knees of the driver. The seat 2 which can be of conventional construction rests on cradle 4 which is joined to absorption means 6. Similarly, the rear passenger sits in a seat 12 and is attached by belt 13 to a cradle 14 swingable about shaft 15 and connected to absorption means 16.

Figure 2:
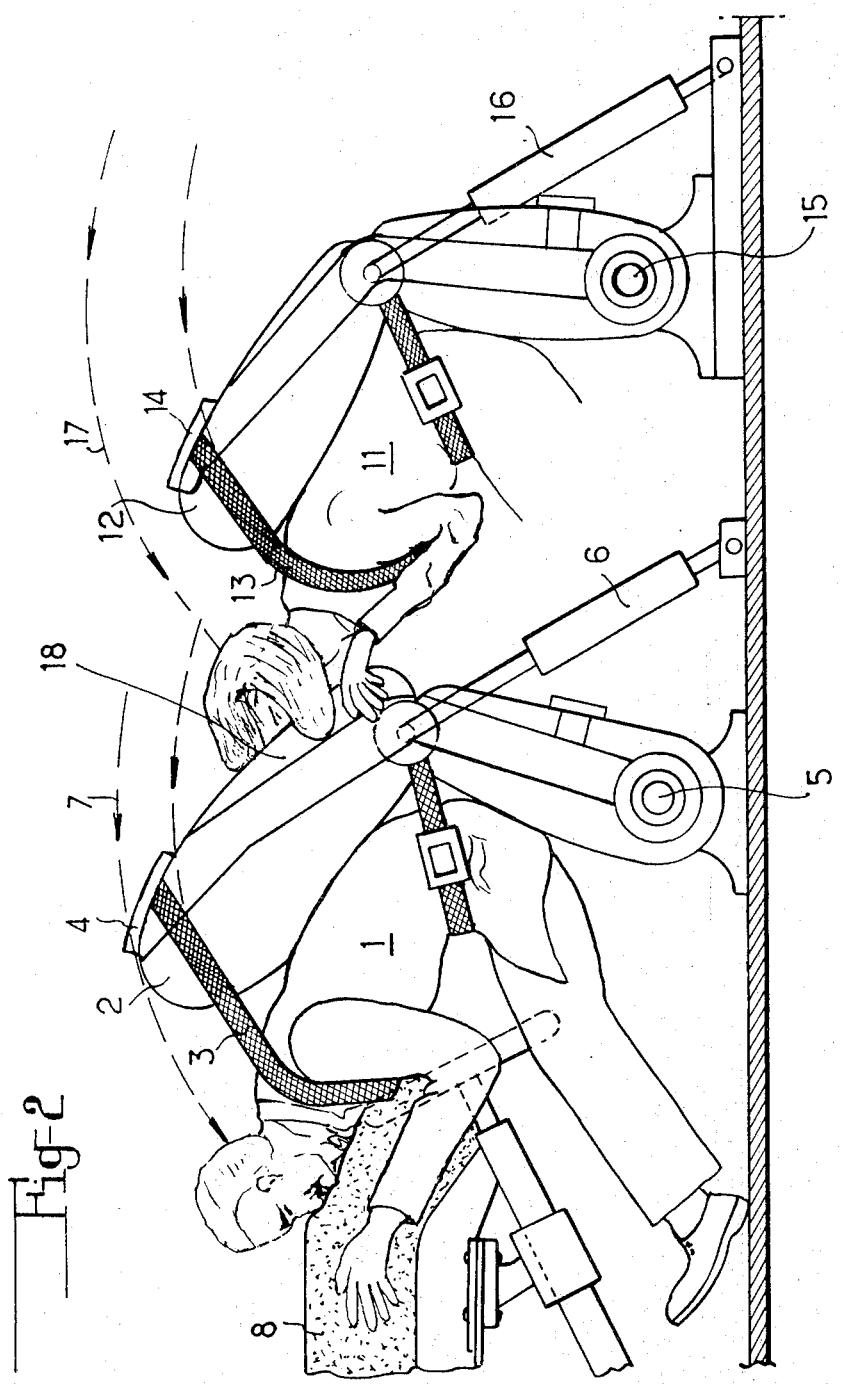
FIG. 2 shows on a larger scale the driver and passenger of FIG. 1 at the end of their travel paths.

In cases of violent frontal collision, the heads of the driver and passenger describe curved paths of travel 7 and 17, substantially circular around the axes of shafts 5 and 15: with reference to FIG. 2, the driver 1, seat 2 (gripped between driver 1 and cradle 4) and the cradle 4 with which the driver is firmly united through safety belt 3, swing forward swiveling around shaft 5 with a considerable absorption of kinetic energy by the means 6. The same is true for passenger 11. Their travel paths are finally halted, for driver 1 by a resilient cushion 8 located between the instrument panel and the wind shield, and for passenger 11 by a resilient cushion 18 on the back of the driver's seat 2.

Figure 3:
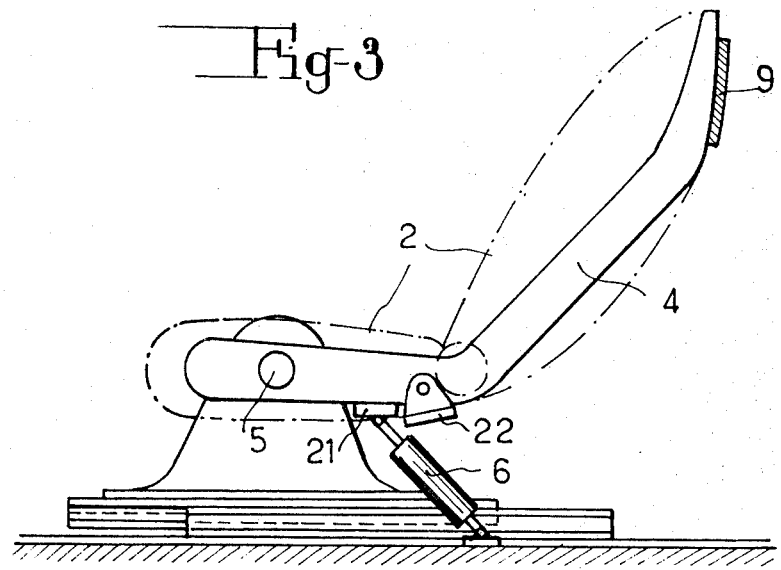
FIG. 3 is a side view of a seat with a cradle according to one embodiment of the invention.
Figure 4:
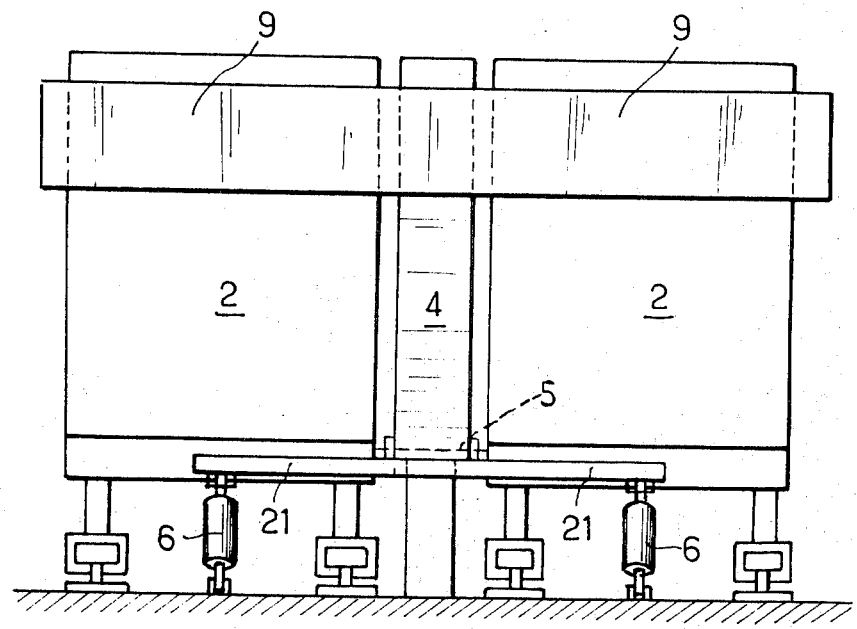
FIG. 4 is a rear view of two seats in accordance with FIG. 3.
Figure 5:
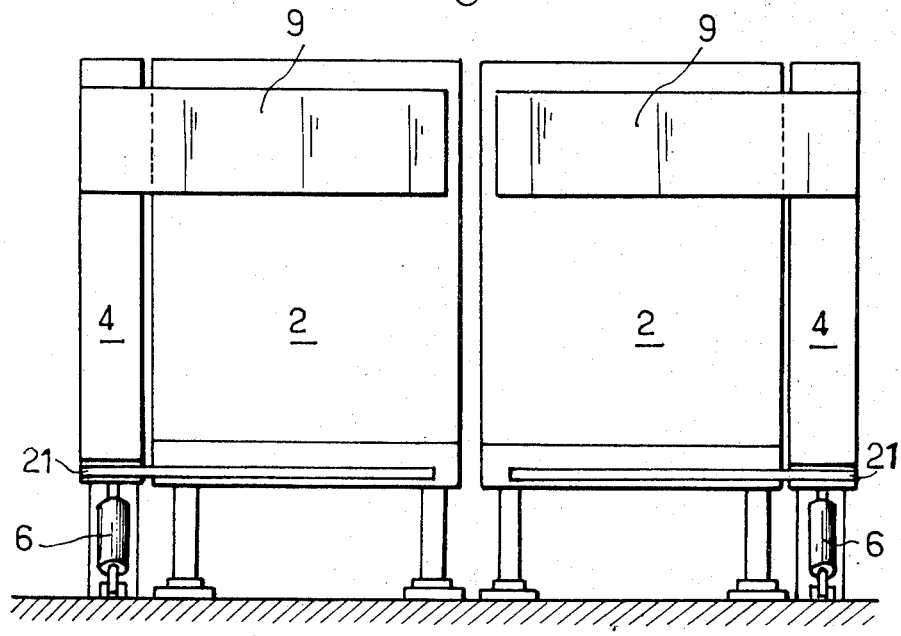
FIG. 5 is analogous to FIG. 4 and illustrates two seats mounted independently of each other according to another embodiment of the invention.
Figure 6:
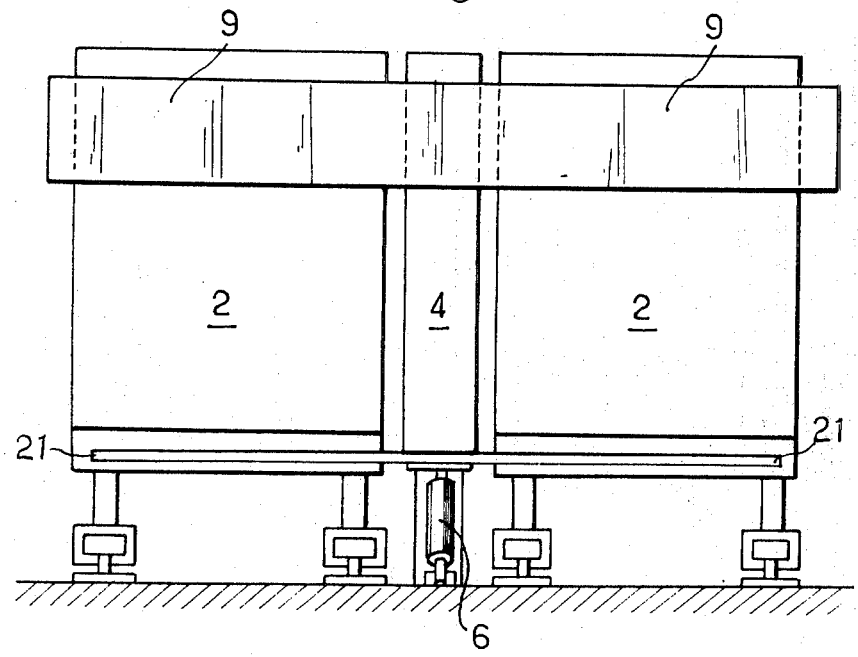
FIG. 6 is analogous to FIG. 4 and illustrates an assembly of two seats in accordance with yet another embodiment of the invention.

Various embodiments of the cradle 4 will now be described. With reference to FIGS. 3 and 4, each seat 2 which can be of a type known per se rests on two transverse members, one of which 9 is behind the top of the back of the seat and the other 21 is beneath the seat of the cradle 41. The cradle 4 which swivels on shaft 5 as already stated, rests on a crosswise abutment 22 (FIG. 3) mounted on the chassis and it is joined to two absorption means 6 (described hereinafter). According to FIG. 5, the two seats 2 each has a cradle 4 with arms 9 and absorption means 6 and are therefore independent from each other. According to FIG. 6, a single cradle 4 with arms 9 is utilized for the two seats 2 and is supplied with a single means 6.

Other embodiments of the invention without a cradle and wherein the seats do not take part in the absorption movement will now be described.

With reference to FIG. 7, the seat 2 is fixedly located between two side brackets 31 pivoted near the floor on a horizontal cross shaft 32 and joined to absorption means 6 at the top of which the safety belt or harness 3 is attached. In the case of a violent impact at the front, the inertia of the passenger pulls the harness 3 forward as seen in FIG. 8 to cause the side brackets 31 to turn on shaft 32 with absorption of the kinetic energy by the means 6.

FIG. 9 is a rear view of an embodiment analogous to that in accordance with FIGS. 7 and 8, wherein there is only one absorption means 36 located beneath seat 2 and operated by two ropes 33 leading to the brackets 31 with return over rotatably adjustable pulleys 34. The operation of absorption means 36 will be described hereinafter.

With reference to FIGS. 10, 11, 12, in this embodiment of the invention, two side brackets 38 of seat 2 are fixed and mount top and bottom return pulleys 35 for each rope 33. The simplicity and economy of this embodiment will be noted as well as the fact that the security harness 3 operates the absorption means 36 directly through the two ropes 33.

Figure 13:
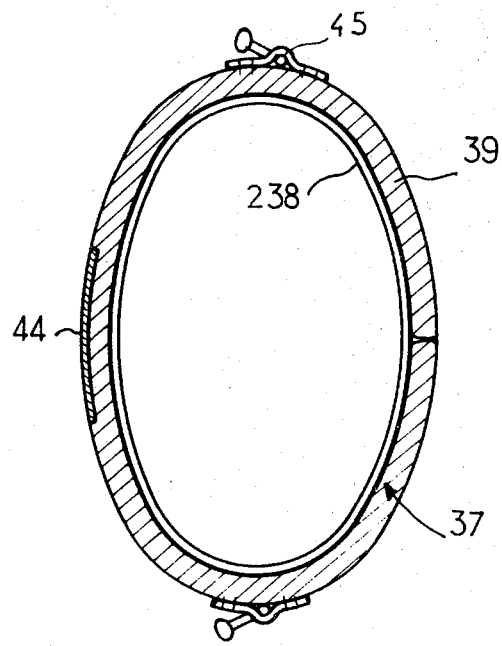
FIGS. 13 and 14 respectively illustrate a horizontal section and a front view of a first embodiment of a safety jacket.
Figure 15:
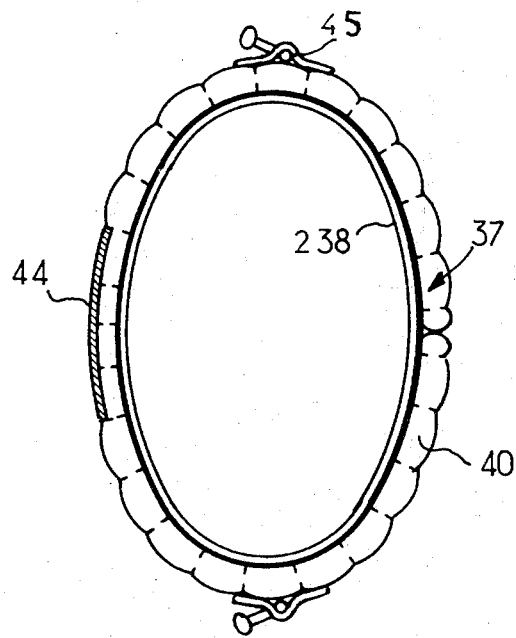
FIGS. 15 and 16 illustrate a second embodiment of safety jacket respectively in horizontal section and front view.
Figure 14:
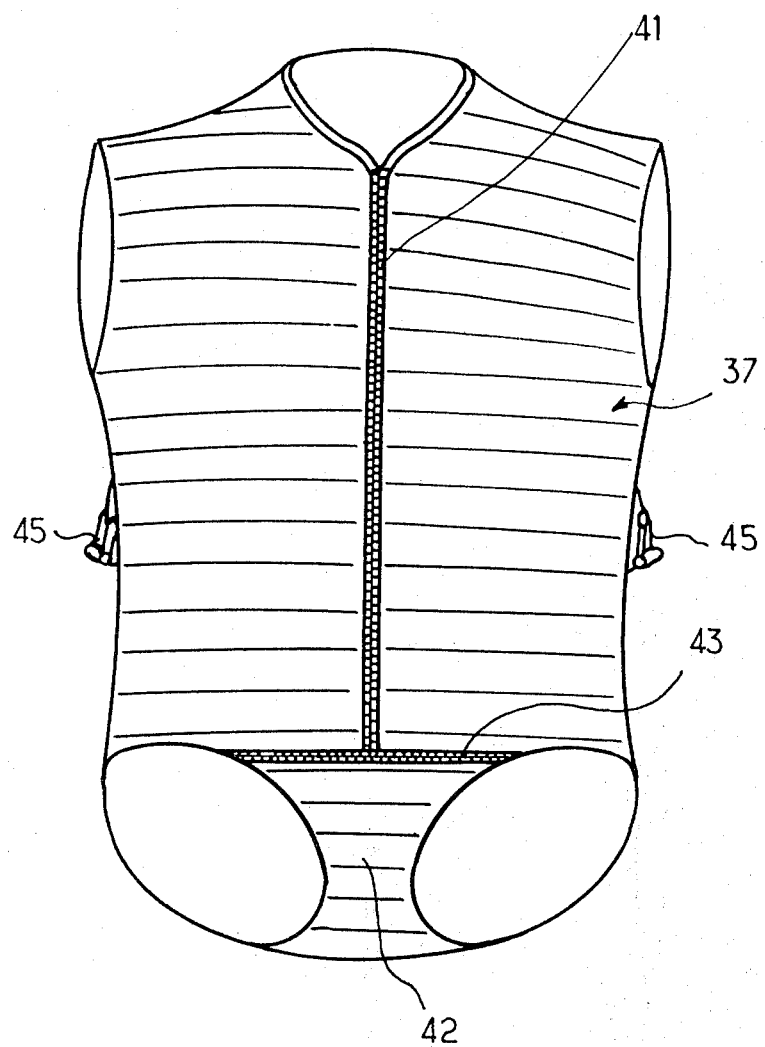
Figure 16:
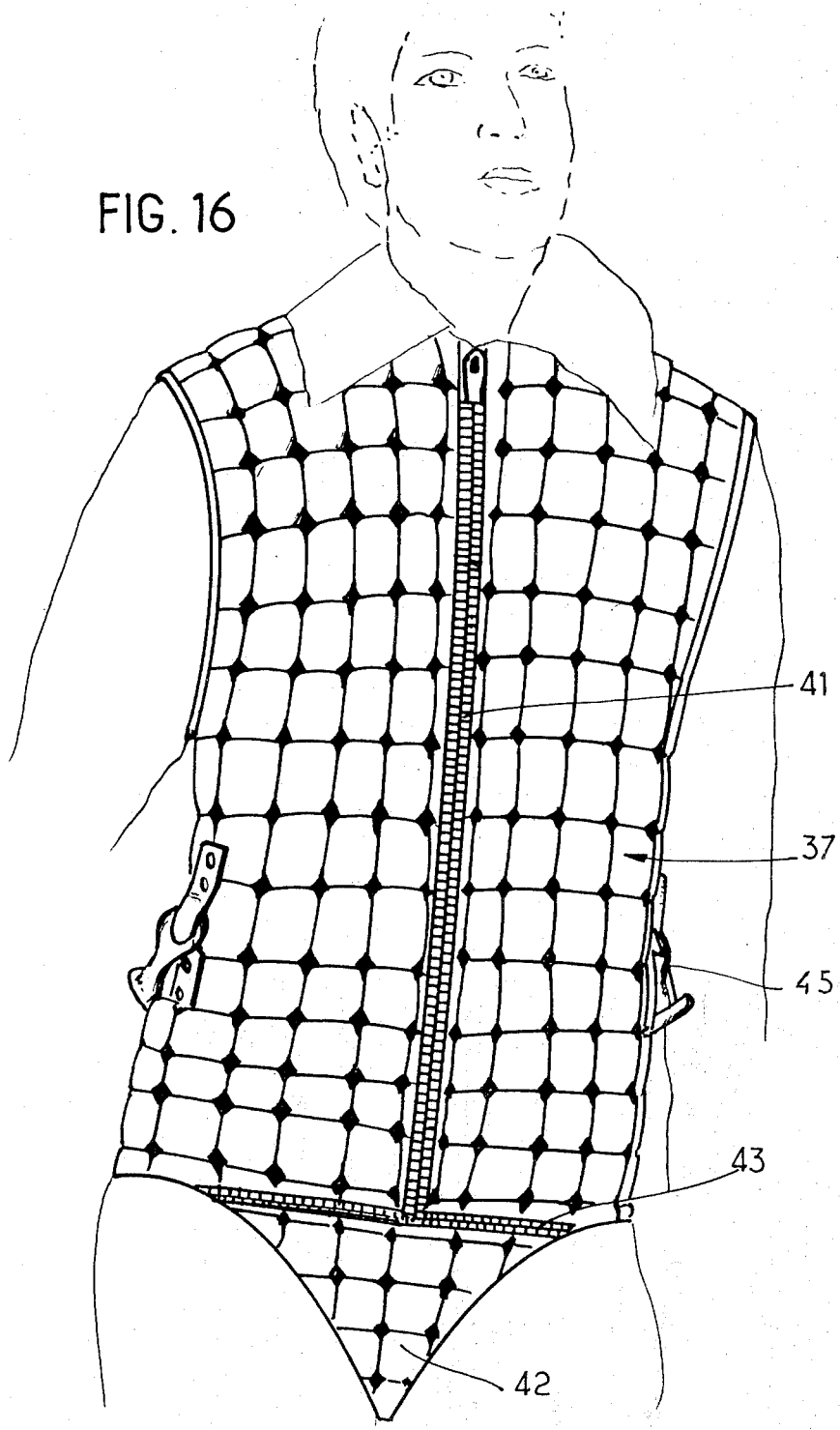
Figure 17:
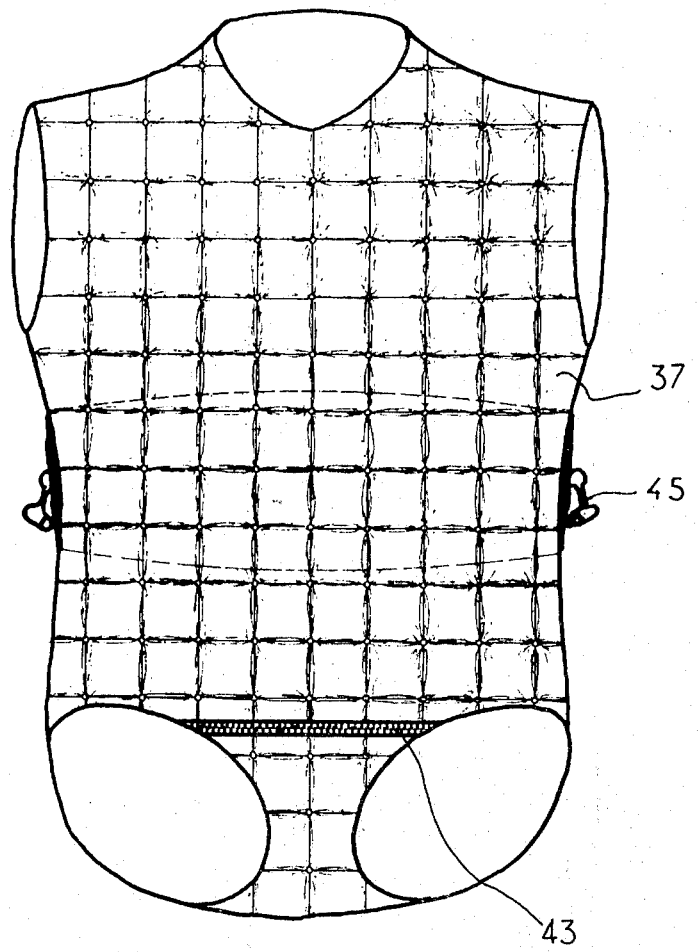
FIG. 17 illustrates a variant of the safety jacket shown in FIGS. 15 and 16.

FIGS. 3–17 illustrate two principal embodiments of a safety jacket 37. These two embodiments are composed by combining two essential constituents: a bullet-proof vest 238 of the type in standard use by the army and police force (FIGS. 13 and 15) or a coat of mail with tightly linked metal rings, the bullet-proof vest forming the inside portion of the safety jacket;

on top of the bullet-proof vest 238 and strongly bonded thereto by any suitable means (particularly by gluing), a shockabsorber member which, according to the embodiment shown in FIGS. 13 and 14, comprises wide horizontal cork or rubber rings 39 joined together by a tough, canvas with strong intermediate seams: or else, according to the embodiment shown in FIGS. 15, 16 and 17, comprising an outer chamber with communicating cells 40 inflated beforehand with air at a suitable pressure.

In each embodiment, the two front portions of the safety jacket can be closed as required by fasteners extremely resistant to pull as for example by a very solid zipper fastener 41 as shown in FIGS. 14 and 16.

The jacket in FIG. 17 does not have a vertical zipper fastener and the jacket is slipped over the passenger's head and when in place can be tightened at the waist by a strong rear fastener similar to that on a man's vest.

The lower rear portion 42 of the safety jacket for protecting the passenger's torso, consists of strong flexible canvas suitably trimmed, and it extends upwardly between the passenger's legs to attach horizontally to the lower front portion of the jacket, by any suitable means such as a horizontal zipper 43 (FIGS. 14, 16 and 17).

The portion 42 just described is lined with a thick flexible material, such as foam rubber to protect the genitalia.

Whatever the form adopted, the back portion of the jacket contains therewithin, a wide flexible metal plate 44 vertically positioned and protecting the entire spinal column which is covered by the entire height of the safety jacket (FIGS. 13 and 15).

Each safety jacket contains on each side, approximately at the level of the center of gravity of the passenger's torso, a strong steel T-shaped lug 45 (FIGS. 13–18) having a fastening ring freely engaged in a solid steel part 46 (FIG. 18) firmly attached to the jacket by a steel strip secured to a fairly large area of the jacket by several rivets running through the entire thickness of the jacket.

A solid clasp 47 clips onto the steel lug 45 (FIG. 18) and is kept in tight engagement therewith by the action of spring 48, so that by application of hand pressure onto the rear portions 49 of the clasp 47 allows the lug to be released.

Figure 18:
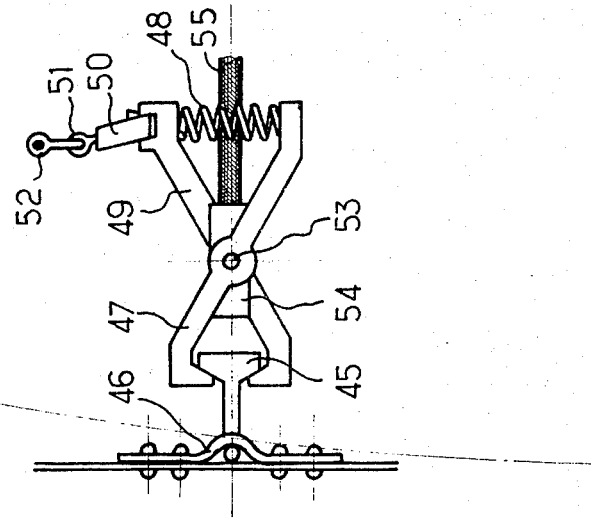
FIG. 18 shows an embodiment by which the safety jacket can be easily fastened to or untied from a restraining rope.

The clasp 47 when free of the lug 45 is kept, for comfort, at the required height by a light workable fastener 50 one of whose ends 51 is joined to the corresponding passengerseat back at point 52 (FIG. 18).

Figure 19:
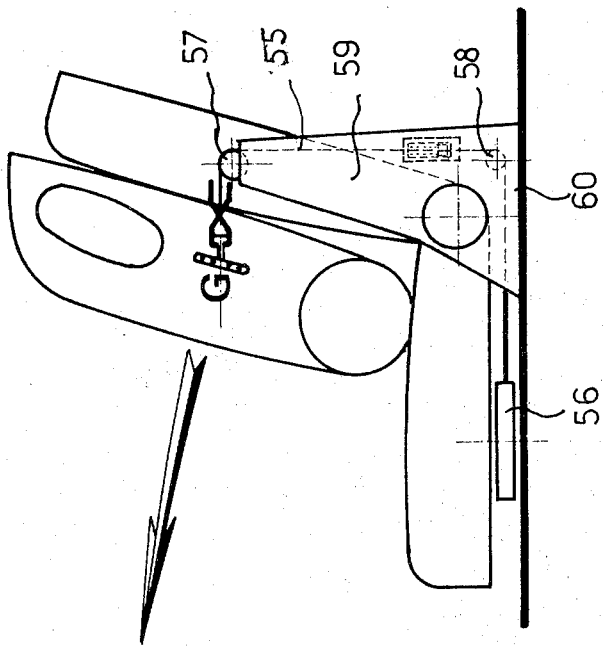
FIG. 19 shows an embodiment in which the rope is fastened to a brake rigidly mounted in the floor structure of the vehicle.
Figure 22:
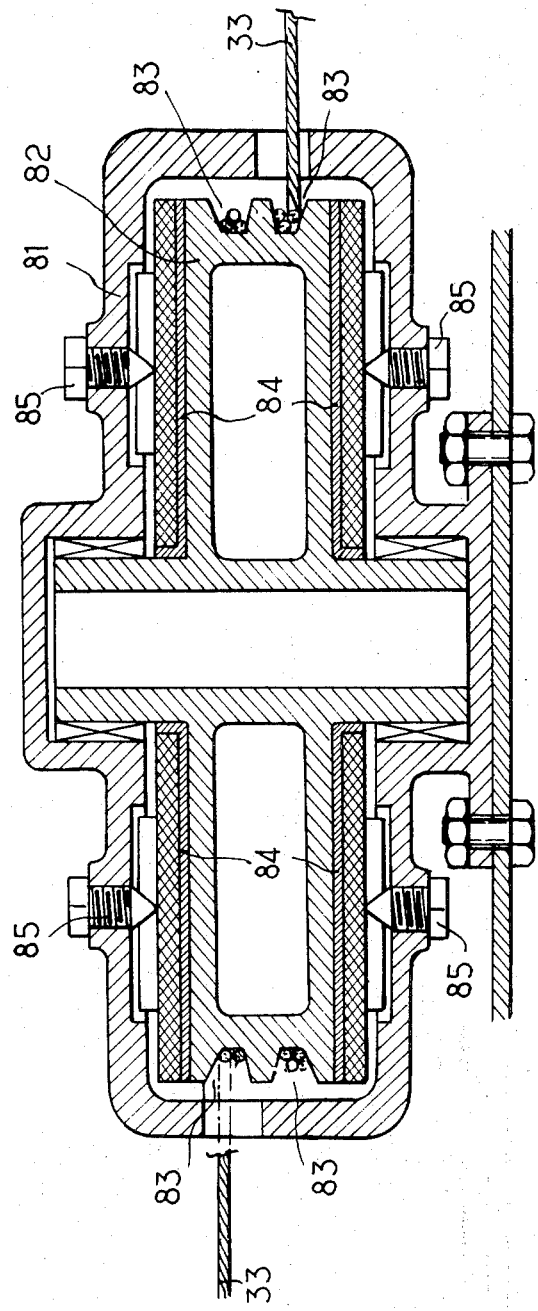
FIG. 22 is an axial section of a double friction brake forming a second embodiment of the means of kinetic energy absorption according to the invention.

The two portions of clasp 47 are mounted on a stud 53 and between said portions, also mounted on the stud, is a metal part 54. At the back of the metal part 54 a flexible cable 55 is firmly secured by being anchored and welded. The metal part 54 can freely pivot around the stud 53. Two flexible cables 55, each corresponding to one of the two side lugs of the safety jacket, are joined to a brake 56 which is absolutely independent of the seat and its back, and which can be for example, a twingrooved double-friction flat-disc brake as depicted in FIG. 22. The cable connection from brake 56 to clasp 47 is effected as shown in FIG. 19, namely following the same arrangements as those depicted in FIGS. 10, 11 and 12, the cable 55 making its return on the two pulleys 57 (top) and 58 (bottom) of the metal pillar 59 rigidly secured to the structure supporting the floor 60 of the vehicle body.

Figure 20:
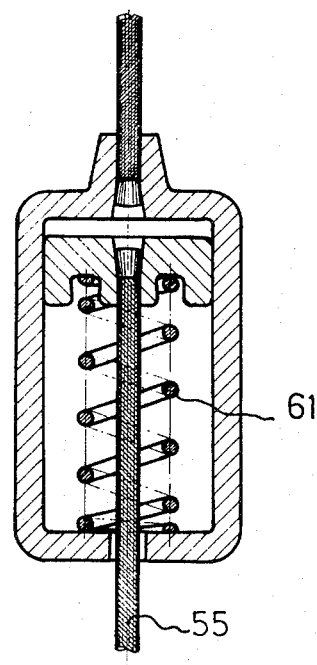
FIG. 20 is a part sectional view illustrating an elastic element which can be inserted vertically on the restraining rope to leave a certain amount of freedom of movement to the passenger when at rest.

The device shown in FIG. 20 can be inserted on each flexible cable 55 between the clasp 47 and brake 56, and this device provides a spring 61 between the two portions of the same cable 55 in order to impart elasticity at the beginning of the braking operation, so that there will ordinarily be a certain forward freedom of movement for the comfort of the passenger.

The kinetic energy absorption means provided by the invention will now be described. Such means can consist of brakes known per se, such as friction brakes.

Figure 21:
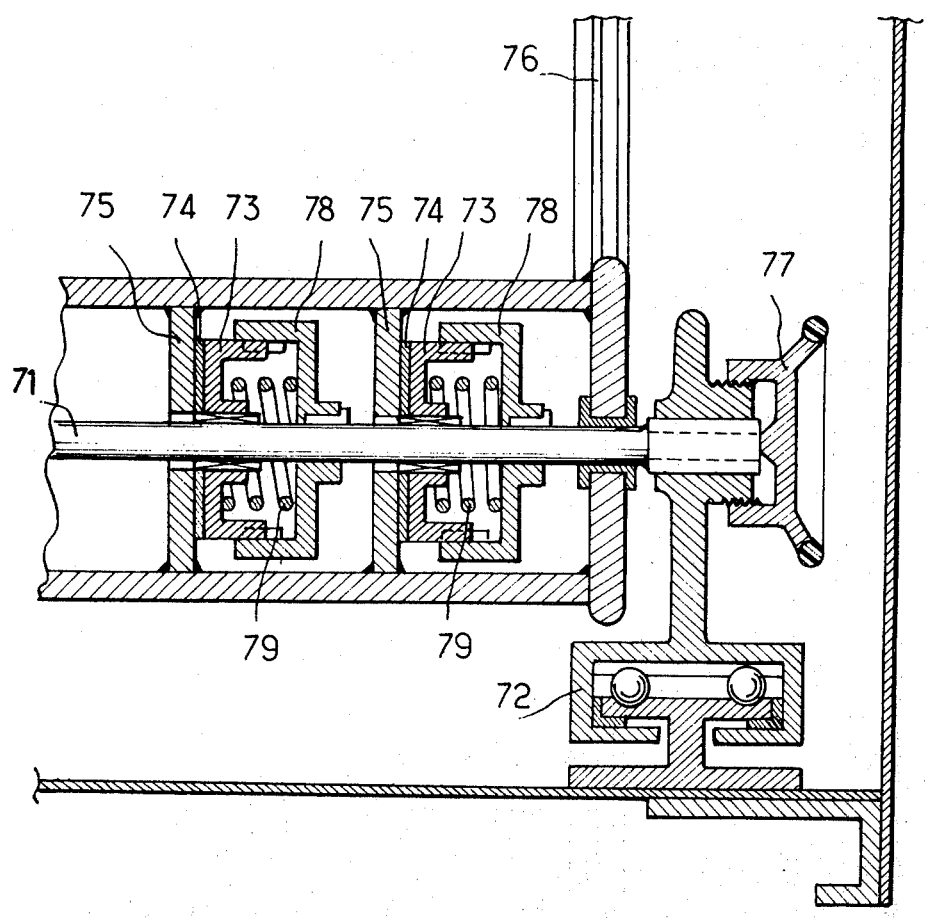
FIG. 21 is an axial section of a friction brake forming one embodiment of the means of kinetic energy absorption according to the invention.

Referring to FIG. 21, one of the shafts 5 (or 15) is produced in the form of a fixed shaft 71, mounted in a conventional bearing 72 capable of sliding from front to back while the shift is rotatably fixed with bushes 73 carrying friction linings 74 capable of rubbing against cheeks 75 fixed to the structure 76 of the seat. The degree of braking is controlled by a hand wheel 77 causing the bushes 78 to slide by resting springs 79 on the bushes 73.

Referring to FIG. 22, the aforesaid means 36 or 56 for kinetic energy absorption comprises a casing 81 fixed to the vehicle chassis and containing a drum 82 mounted on a vertical shaft and provided with two grooves 83 each receiving one of the abovementioned cables 33; the rotation of drum 82 under the traction of the two cables 33 or 55 which are wound in the same direction in the two grooves 83 is resisted by friction linings 84, the locking of which is governed by needle-screws 85. It will be noted that two cables 33 or 55 pulling oppositely on the said means 36 cause this to be balanced by reason of its design and it will be observed that its low vertical space requirement facilitates its accommodation between the seat and the floor (for example in accordance with FIGS. 9–12).

Figures 23, 24:
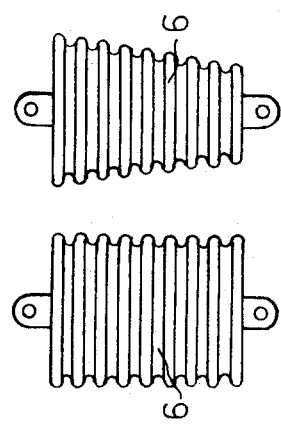
FIGS. 23 and 24 illustrate two tubular devices according to further embodiments of the means of absorption according to the invention.

Referring to FIGS. 23 and 24, the means 6 for kinetic energy absorption comprises a hollow tube which can be cylindrical as shown in FIG. 23 or frusto-conical as shown in FIG. 24. The hollow tube is formed with external irregularities such as grooves or impressions obtained, for example, by milling or axial compression. Such a tube can elongate under tension absorbing considerable energy in relation to the space it occupies.

Figure 25:
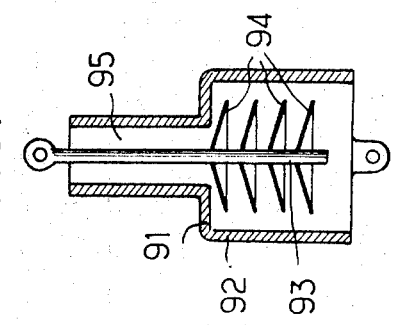
FIG. 25 illustrates yet another tubular device according to another embodiment of the absorption means in accordance with the invention.

With reference to FIGS. 25, the energy absorption means according to the invention comprises a hollow tube 91 having two portions of different diameters; in the wider portion 92 there is housed a stem 93 carrying a plurality of discs 94 in the form of radial vanes. Under tension, stem 93 passes into the narrower portion 95 of tube 91, successively deforming the vanes 94 on entry into portion 95, thereby absorbing considerable energy.

The arrangements provided by the invention for clearing the driver's path of travel will now be described.

Figure 26:
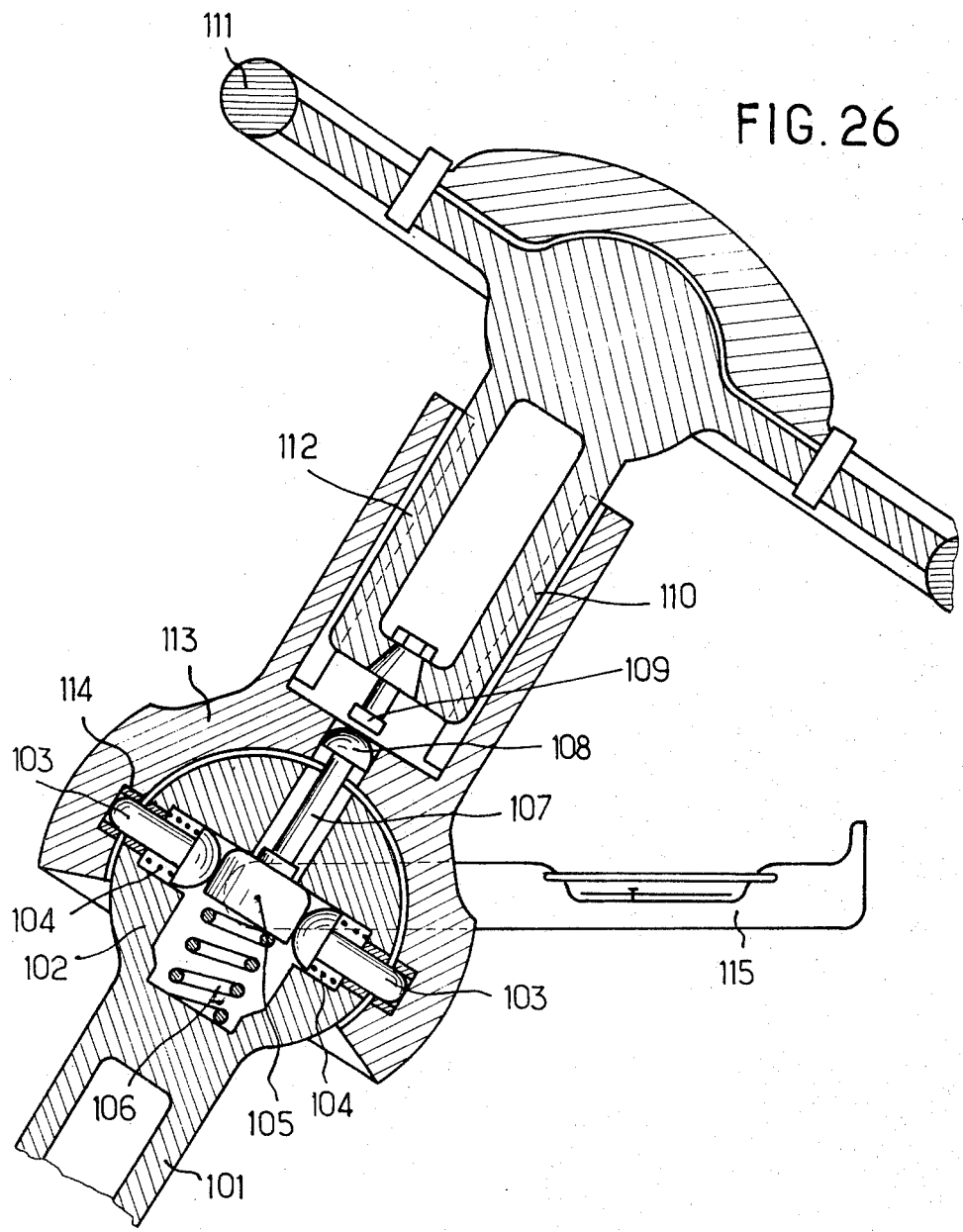
FIG. 26 is an axial section of a steering post in which the steering wheel is automatically retracted out of the driver's travel path.

Referring to FIG. 26, the steering shaft 101 coming from a conventional steering gear box terminates in a spherical knuckle 102 beyond which radial fingers 103 project and are urged, against the action of springs 104, by a plate 105 having an axial spring 106 firmly attached to a stem 107 ending in a rounded head 108. The head 108 is subjected at the instant of collision, to the action of striker 109 integral with the steering post 110 and steering wheel 111. The post 110 is mounted telescopically in grooves 112 in an intermediate part 113 housing the knuckle 102 and provided with sleeves 114 for receiving the tips of the fingers 103. Under sufficient force in the case of collision, the steering wheel 110 depresses the striker 109 which upon moving downwards in turn, depresses the stem 107. Consequently, the plate 105 releases the fingers 103 so that the springs 104 retract the fingers 103 simultaneously with the depression of head 108 inside the knuckle 102. The part 113 now is free to turn on the knuckle 102 and thus the steering wheel 111 telescopes into the part 113 and the assembly of the wheel and part 113 can swivel freely on knuckle 102, said part 113 causing in its movement the rotation of the instrument panel 115 which is rigdly joined thereto and whose displacement out of the path of the driver and passengers takes place as a consequence.

Figure 27:
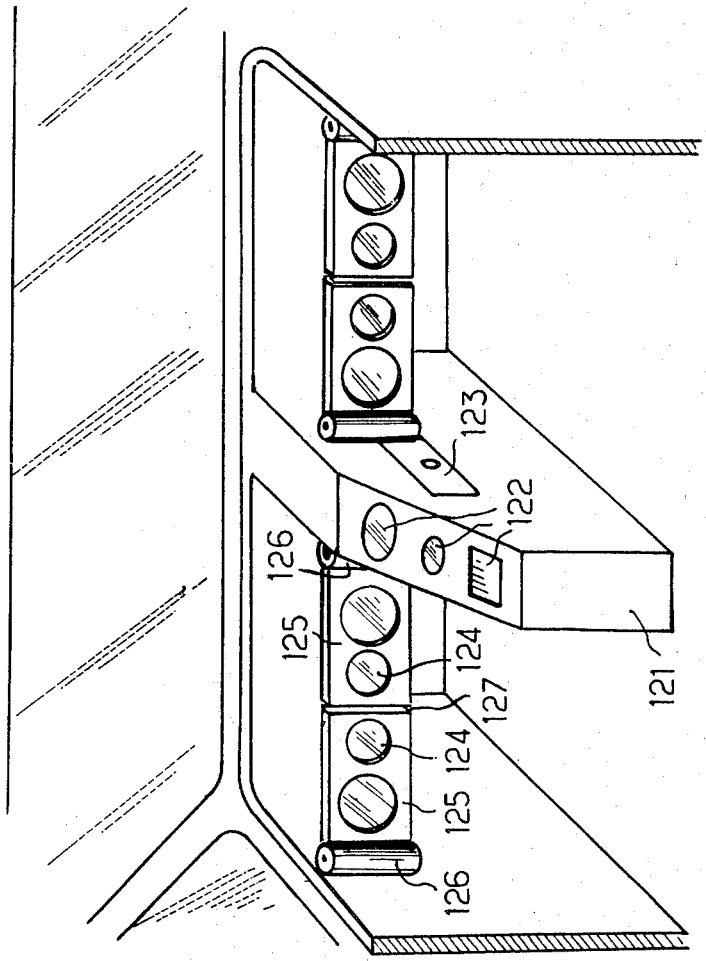
FIG. 27 is a perspective view of an instrument panel which, when the steering wheel slides away according to a different operation from that in FIG. 26, opens under the effect of the impact of the passenger, into two portions such as those of a double-wing door.

With reference to FIG. 27, therein is seen an instrument panel in accordance with the invention comprising a medial fixture 121 containing some of the instruments 122 (principally the mechanically driven instruments, such as, the speedometer and the like) while at one side of the fixture 121 is glove compartment 123. The other instruments 124 (mainly the electrical instruments) are mounted on two trays 125 with lateral hinges 126 (which could be vertical or horizontal) in which pass the connections for the instruments 124. A frangible part 127 holds the two trays 125 in position. Under the driver's weight, part 127 gives way and the two trays 125 fold laterally without injuring the driver.

Figure 28:
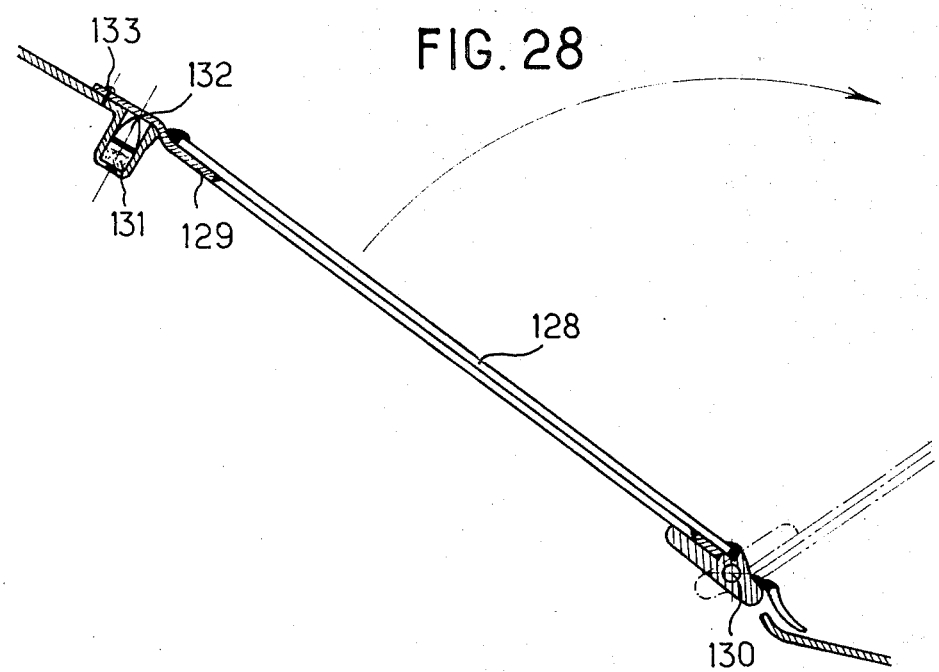
FIG. 28 is a longitudinal vertical section illustrating the sliding away of the windshield and its frame, turning on low-set horizontal hinges, the opening of the windshield being brought about by a series of powder charges located transversely all along the top of the windshield.

As shown in FIG. 28, the windshield 128 and its frame 129 can pivot forwardly by turning on low horizontal hinges 130, so that the slope of the windshield when pivoted forwardly is such as to result in guiding the passenger's body into a safe zone out of the path of any wreckage bent back from the front of the car by the collision.

The pivotal movement of the windshield is effected by the operation of a series of powder charges 131 and projectile cartridges 132 placed at the top of the windshield or in the top front portion of the vehicle roof. Ignition of the powder for each cartridge comes from an electric spark produced by a contact breaker (not shown) which completes an electric circuit under the action of a rocker switch having a plunger (not shown) which is thrown forward, by inertia, under the effect of the collision thereby completing the electrical ignition circuit.

The projectiles 132 are then simultaneously fired breaking the attachment of the windshield with the top forward portion of the vehicle body and causing forward pivotal movement of the windshield about hinge 130, the connection between the windshield and the body being by an adhesive or small rivets 133 which shear under the force of the projectiles.

It will be noted that the manner in which the steering wheel shown in FIG. 26 and the instrument panel slide results in raising slightly upward the body of the passenger who has been thrown forward, and to bring him precisely into the opening of the windshield which has also automatically pivoted forwardly.

It is also noted that the rear passengers equipped with safety jackets combined with means for kinetic energy absorption, as previously described, are restrained the same way. Their bodies can travel over the front seats and even, if the collision is very considerable, through the now open windshield.

What is claimed is:

1. Apparatus for improving the safety of the driver and passengers in a vehicle in the case of collision, said apparatus comprising a seat for each occupant in the vehicle, a safety jacket for each occupant comprising a bullet-proof vest, an elastic coating firmly bonded to and covering said bullet-proof vest, a broad, flexible, metal plate within the rear portion of the jacket, said plate being positioned vertically for protecting the spinal column of the occupant, connector means for rapid connection and disconnection purposes disposed on each side of the jacket at substantially the level of the center of gravity of the occupant, a cable connectible and disconnectible to said connector means, and kinetic energy absorption means disposed beneath the seat and connected to said cable for applying a braking force to said cable and thereby to the occupant to resist forward movement under inertia forces produced by rapid deceleration of the vehicle.

2. Apparatus as claimed in claim 1 wherein said elastic coating comprises wide horizontal elastic rings interlinked by tough canvas with strong intermediate seams.

3. Apparatus as claimed in claim 1 wherein the elastic coating comprises a pneumatic cover pre-inflated with air at elevated pressure.

4. Apparatus as claimed in claim 1 wherein the safety jacket includes a lower rear portion extending downwards, adapted for passing between the legs of the rider to attach horizontally to the bottom part of the front of the jacket, by horizontal closure means, said bottom rear portion of the jacket being internally lined with a substantial thickness of resilient material to protect the genitalia.

5. Apparatus as claimed in claim 4 wherein said horizontal closure means comprises a strong zipper.

6. Apparatus as claimed in claim 1 wherein said safety jacket comprises two parts horizontally divided and interconnected by a closure means resistant to strong horizontal tensile forces from both sides.

7. Apparatus as claimed in claim 6 wherein said closure means is a strong vertical zipper.

8. Apparatus as claimed in claim 1 wherein the front portion of the said safety jacket is continuous and is slipped over the head of the rider, said jacket being taut at the waist at the back to avoid rubbing.

9. Apparatus as claimed in claim 1 wherein said connector means comprises a T-shaped steel lug with a connecting ring, a solid steel part slidably receiving said connecting ring, and a steel strip fixedly secured over a fairly large area of the jacket, said steel part being fixedly connected to said strip.

10. Apparatus as claimed in claim 1 comprising a clasp solid with said cable at each side of said jacket, said clasp including a spring to hold the clasp in secured position on the jacket, said clasp being unfastened by application of hand pressure thereon to oppose said spring, each clasp when unfastened being maintained at a desired height by a fastener, one end of which is joined to the side of the corresponding seat.

11. Apparatus as claimed in claim 1 comprising a clasp attachable to said connector means on said jacket, a metal part pivotably connected to said clasp, said cable being connected to said metal part.

12. Apparatus as claimed in claim 1 comprising fixedly supported top and bottom pulleys on which said cable passes.

13. Apparatus as claimed in claim 1 wherein the said cable includes a spring device between said jacket and said kinetic energy absorption means to provide elasticity at the start of braking and thereby providing limited movements in the rest position.

* * * * *